United States Patent [19]
Weir et al.

[11] Patent Number: 5,868,891
[45] Date of Patent: Feb. 9, 1999

[54] PEEL AND STICK INSULATION HAVING A COMMON CARRIER SHEET

[75] Inventors: Charles Russell Weir, Westerville; Frederick R. Ernest, St. Louisville, both of Ohio; John M. McCall, III, Trophey Club, Tex.; John C. Hasselbach, Granville, Ohio

[73] Assignee: Owens Corning Fiberglas Technology, Inc., Summit, Ill.

[21] Appl. No.: 741,848

[22] Filed: Oct. 31, 1996

[51] Int. Cl.$^6$ .............................. B32B 31/10; B32B 31/12
[52] U.S. Cl. ............................... 156/230; 118/44; 118/75; 118/211; 118/221; 118/239; 156/184; 156/302; 156/306.3; 156/443; 156/541; 156/578; 156/552
[58] Field of Search .................................. 156/184, 230, 156/249, 291, 295, 297, 299, 302, 306.3, 324, 552, 356, 357, 443, 538, 539, 540, 541, 578; 118/44, 75, 200, 202, 211, 216, 221, 222, 235, 239

[56] References Cited

U.S. PATENT DOCUMENTS

| | | | |
|---|---|---|---|
| 3,226,910 | 1/1966 | Steffey | 53/397 |
| 3,598,679 | 8/1971 | Ettre et al. | 156/249 |
| 3,869,328 | 3/1975 | Instance | 156/285 |
| 3,888,716 | 6/1975 | Morse | 156/276 |
| 4,022,248 | 5/1977 | Hepner et al. | 138/141 |
| 4,134,948 | 1/1979 | Baker, Jr. | 264/518 |
| 4,447,490 | 5/1984 | Ventker et al. | 442/378 |
| 4,700,521 | 10/1987 | Cover | 52/404.3 |
| 4,764,234 | 8/1988 | Smits et al. | 156/164 |
| 4,797,170 | 1/1989 | Hoopengardner | 156/71 |
| 4,923,539 | 5/1990 | Spengler et al. | 156/79 |
| 4,931,125 | 6/1990 | Volkmann et al. | 156/272.8 |
| 5,019,197 | 5/1991 | Henderson | 156/212 |
| 5,106,447 | 4/1992 | Rado et al. | 156/334 |
| 5,112,678 | 5/1992 | Gay et al. | 442/173 |
| 5,277,955 | 1/1994 | Schelhorn et al. | 428/74 |
| 5,472,541 | 12/1995 | Simmons et al. | 156/231 |

FOREIGN PATENT DOCUMENTS 0725117 8/1996 European Pat. Off. .

*Primary Examiner*—Francis J. Lorin
*Attorney, Agent, or Firm*—C. Michael Gegenheimer; Curtis B. Brueske

[57] ABSTRACT

An adhesive is applied to a material under compression such that the adhesive penetrates the material when the material is a porous material (e.g., a fiberglass batt). Upon release from being compressed, the material returns to nearly its original size and shape and some of the adhesive penetrates into the material a given distance. Many mats of the material bearing the adhesive at selected locations can be placed on a common carrier for easy dispensing using a dispenser. The common carrier can be refurbished for reuse.

21 Claims, 6 Drawing Sheets

PEEL AND STICK INSULATION HAVING A COMMON CARRIER SHEET

BACKGROUND OF THE INVENTION

1) Field of the Invention

The present invention relates to a method and apparatus for adhesive bonding of a plurality of peel-and-stick or self-stick porous products to a common carrier (e.g., release sheet or paper) of indeterminate length, for automatic dispensing of the self-stick, porous products from the common carrier, and for refurbishing the common carrier for reuse.

2) Description of Related Art

Fiberglass panels coated with an adhesive which can be reactivated are used for a variety of applications. For instance, insulation panels of fiberglass batting for heating, ventilating and air conditioning (HVAC) units are known to be bonded to metal housings by a spray application of a hot melt adhesive composition. The adhesive is sprayed onto either the metal housing or the fiberglass insulation, as disclosed in U.S. Pat. No. 5,106,447 of Di Rado et al. The fiberglass insulation is to protect against weather, reduce sound, stop water vapor from forming on the metal, and separate hot compression units from cold freon gas coils.

Continuous batts of semi-rigid porous materials, such as a foam, cellulose, and/or fibrous materials coated with thermoplastic adhesive which can be reactivated, are known to be for use in automotive trim panels which can be made by using an adhesive coated panel and a shell or substrate and laminating a decorative cover on the adhesive coated side of the panel. These adhesive coated panels can also be used for the manufacture of other automotive products such as floor pads, hood liners, trunk liners, seating, and door panels, such as disclosed in U.S. Pat. No. 5,472,541 to Simmons et al. In the process disclosed in the Simmons et al patent, a powder thermoplastic adhesive is placed on a release coating on a conveyor and heated to a plasticized state. Porous material is then added and the adhesive is reheated to a melted state such that the adhesive bridges, rather than penetrates, the pores of the porous material.

In addition to conventional spray methods, materials can be coated with adhesive by heating the adhesive to a sinter temperature and then transferring the heated adhesive onto the surface of a printing roll. As the flexible material passes between the printing roll and a contact pressure roll, the adhesive is released onto the surface of the material that is in contact with the printing roll. Alternatively, powdered adhesive is sprinkled onto the material and heated with a radiant heat source to a temperature sufficient to melt the adhesive and allow the same to adhere to the underlying material.

These processes are inadequate for a number of reasons. For instance, prior processes apply adhesive to an entire surface of a fibrous material of uniform width. The adhesive adheres only to the surface fiber and surface dust, resulting in a weak interfacial bond between the fibrous material product, e.g. fiberglass product, and the adhesive.

Further, the fibrous material is generally cut to shape after the adhesive is applied. This means that the cutting of uniquely shaped products requires the cutting mechanism to cut through adhesive, which can lead to clogging of the cutting machine, etc. This also leads to substantial waste of the fibrous material and adhesive located outside the boundaries of the desired shape. Also, the common carrier becomes scrap after the product is removed. This waste material has to be disposed of by the customer, such as an HVAC manufacturer, which is costly and environmentally unsound. Furthermore, much if not all of this material could be easily recycled if not for the presence of the adhesive and the burden of shipping the material back to the fibrous material fabricating facility.

Additionally, prior self-stick fiberglass materials conventionally need to be cut to shape by the customer, which is labor intensive and messy.

The conventional processes of applying adhesive to porous mats typically do not include the ability to exclude areas of the mats from application of the adhesive. Such non-adhesive coated areas are sometimes desired for flanges that are not intended to be adhered to a surface and edge portions which otherwise would include exposed glue edges to which dirt and debris collects. Spraying adhesives usually involves airborne solvents or other secondary products which are not environmentally desirable.

Another system uses a vacuum and ramp conveyors designed to compress and draw hot melt adhesive into fiberglass products to increase the bonding strength, as disclosed in EP 0,725,117, published Aug. 7, 1996. While this vacuum system is advantageous over other systems, the use of adhesive drawing vacuums is not applicable to fiberglass materials having a non-porous facing material (e.g., foil or kraft paper) located on the opposite surface of the fiberglass relative to the surface on which the adhesive is applied, because of the inability to produce a vacuum through the nonporous facing material.

SUMMARY OF THE INVENTION

The present invention mitigates or eliminates the above drawbacks by providing a plurality of porous mats in precut shapes adhered to a common release sheet or paper such that the porous mats can be automatically separated from the common carrier, e.g., by machine. The porous mats can be of a polygonal or irregular shape as desired by the customer without requiring the user to deal with the non-used portions of the porous mats or the common carrier waste. The common carrier, such as silicone release paper, could be easily reused without requiring the paper to be reformed, because it is not precut.

Additionally, the present invention permits the use of simple dispensing machines for separating the self-stick porous mats from the common carrier.

Further, because of the controlled application of adhesive on the preshaped self-stick products, there is little, if any, adhesive waste. Furthermore, because the shape of the self-stick products is cut prior to the application of the adhesive, such cutting processes are simplified while allowing the adhesive application to be placed on irregularly shaped products. The scrap porous material can potentially be recycled with greater ease than the prior systems insofar as it is not necessary to deal with the adhesive as a contaminant.

Separate control of the adhesive applicators allows for areas on irregularly shaped precut mats in which no adhesive is to be applied, thereby enabling an edge border zone and flange portions, which are also desirable, to be free of adhesive.

The present invention permits the application of adhesive onto cut-to-size products having a non-porous face (e.g., foil or kraft-faced products), which are excluded from the prior adhesive drawing vacuum method of manufacture of peel and stick products.

According to an exemplary embodiment of the present invention, a self-stick panel product comprises a plurality of cohesive, resiliently compressible mats of one or more predetermined shapes, adhesive selectively located on one surface and penetrating into each of the porous mats, and a common carrier, wherein the plurality of compressible mats are adhered to the common carrier by the adhesive.

According to another aspect of the present invention, a system for providing preshaped self-stick panel products comprises a process line including at least one adhesive applicator head for selectively applying adhesive to the preshaped porous mats, and a common carrier applicator for applying a common carrier to a plurality of the porous mats, the applied adhesive adhering the plurality of the porous mats to the common carrier, thereby providing a package of preshaped self-stick panel products on a common carrier, and a dispenser machine including a stripper for selectively removing the common carrier from the package of preshaped self-stick panel products on a common carrier.

BRIEF DESCRIPTION OF THE DRAWINGS

The present invention will be now described by way of exemplary embodiments with reference to the accompanying drawing figures, in which.

DETAILED DESCRIPTION

As used herein, the term "porous mat" means a material which is resiliently compressible to a degree such that after compression the material returns to a substantially identical size and shape and has a surface porosity large enough to permit adhesive to enter the material in a compressed state. Examples of such porous material include polyester fiber, polypropylene fiber, fiberglass or any other mineral fiber to which a binder is added which holds the individual fibers together where they cross one another to form a cohesive wool. Such mineral fiber mats include flexible glass wool mats having a density from about 15 kg/m$^3$ to 80 kg/m$^3$ and rock wool mats ranging in density from about 60 kg/m$^3$ to 200 kg/m$^3$, for example. Additionally, foam, cellular, or organic fibrous (either woven or unwoven) materials can form the porous mat. The porous mat can include surfaces, other than the one to which the adhesive is to be applied, to which non-porous layers (e.g., aluminum or other material foils, kraft paper, etc.) are applied. The process disclosed herein can also be used to provide adhesive on a non-porous material such as a non-rigid closed cell foam material which is compressible.

The self-stick products 10 resulting from the inventive process may have a uniform or non-uniform thickness, width, or length for application in home appliances such as washing machines, dryers, dish washers, refrigerators, toaster ovens, microwaves, and standard ovens and/or range tops, for example. The self-stick products 10 can also be used in HVAC systems, automobiles, airplanes, and virtually any other application where sound damping, heat insulation, protection from environmental factors, etc. through use of a compressible material is desirable.

The self-stick products 10 can come in a variety of shapes and sizes desired by the customer, such as a manufacture of HVAC and other OEM equipment, including mixing a variety of shapes and sizes on a single package of self-stick products as desired by the customer.

The adhesive 12 can be an elastomer-based adhesives or hot melt adhesive, or isostatic thermoplastic adhesives. However, nearly any viscous adhesive having a large solids content can be used. For instance, pressure sensitive hot melt adhesives, solvented or waterborne adhesives can be used, though the solvented adhesives are not as environmentally friendly and the waterborne adhesives can be sensitive to humidity. The adhesives can include flame retardants, antioxidants, or other additives. Adhesives such as those discussed in U.S. Pat. No. 5,106,447 can be used, for instance.

Peel-and-Stick Products

Figure 1A:
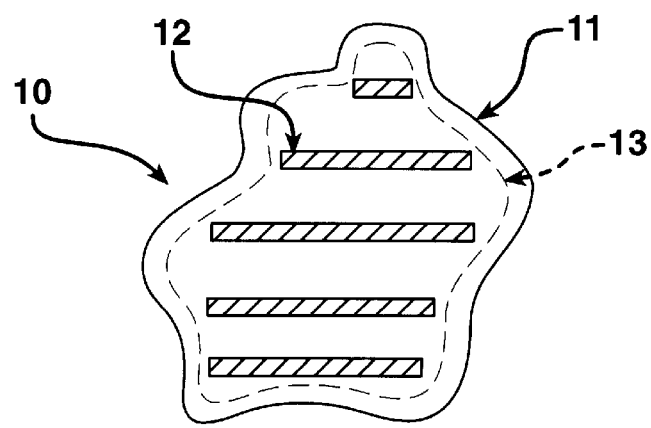
FIG. 1A shows an example of an irregularly shaped self-stick product in accordance with the present invention.
Figure 1B:
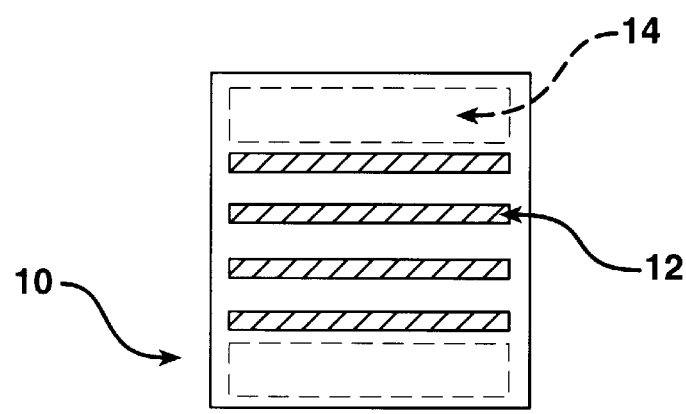
FIG. 1B shows an example of a self-stick product having flange zones where no adhesive is applied in accordance with the present invention.

The inventive self-stick product 10 can take on an irregular shape such as illustrated in FIG. 1A, or a polygonal shape such as illustrated in Figure 1B. The adhesive strips 11 can be selectively formed within an adhesive border zone 13, which is interior to a product border 12 such that the edge of the self-stick panel product 10 does not include exposed adhesive edges.

As illustrated in FIG. 1B, non-adhesive zones 14, which form flanges where an adhesive is not desired, can be formed by the selective application of the adhesive strips 11 at other locations. These non-adhesive zones 14 are in addition to the adhesive-free zone at the edge of the self-stick product 10.

Figure 2:
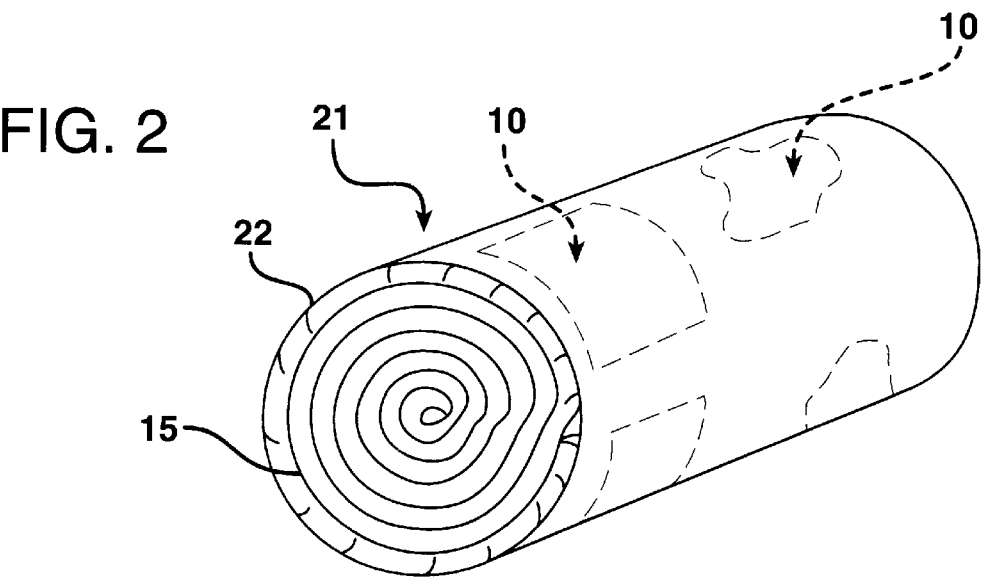
FIG. 2 illustrates a self-stick panel product on a common carrier in packaged form in accordance with the present invention.

As can be seen in FIG. 2, multiple finished products 10 can be captivated within layers of a common carrier 15. The common carrier 15 can be a form of release liner substrate material such as silicon paper, kraft paper, polyethylene-coated paper or film, or the like, which is either virgin or recycled. The multiple finished products 10 may be sequentially arranged in a row along the long dimension of the common carrier 15, or sequentially arranged and arranged side by side in a matrix format, including mixing the shapes of the self-stick products 10 in an order to accommodate the manufacturing steps used by the customer in fabricating an appliance or the like. The packaged product 21 may be encased in a polyethylene bag or stretch-wrap package 22 to protect the self-stick products 10 during shipping.

Process Line

Figure 3:
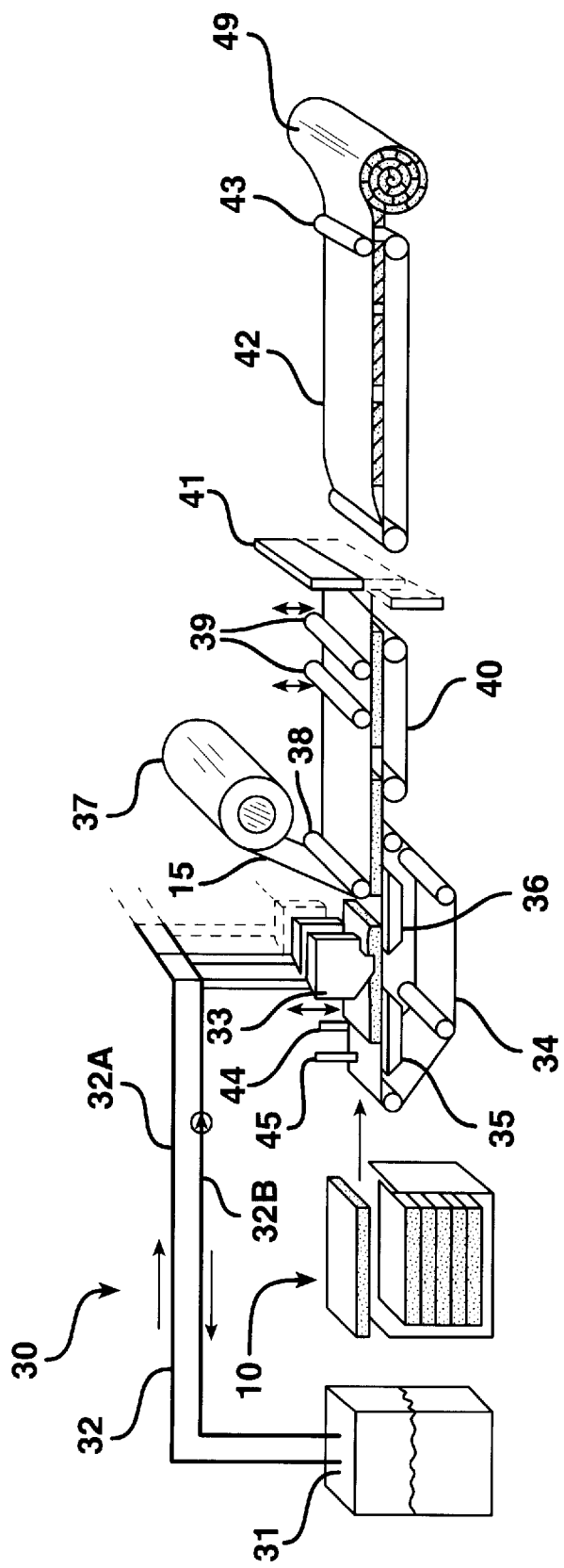
FIG. 3 illustrates a process line for producing self-stick panel products on a common carrier using a compressing adhesive applicator head in accordance with the present invention.

The package 21 of self-stick products can be produced by a unique process line 30 illustrated in FIG. 3. The process line 30 includes at least one adhesive applicator head 33 which selectively applies adhesive to the preshaped porous mats 10. In practical application, there would be a number of adhesive applicator heads 33 located side-by-side in spaced relationship for approximately the width of the common carrier 15, as illustrated in FIG. 3. Each of the adhesive applicator heads 33 is separately activated and can be separately displaced toward and away from the entry conveyor 34 to accommodate the different thicknesses of the porous mats 10, as further explained below.

Specifically, the process line 30 applies adhesive 12 to porous mats 10 in the form of ribbons of adhesive 12 which are forced under controlled pressure and temperature into the mat material. The adhesive 12 penetrates the pores of the porous material and becomes an integral part of the self-stick product 10. The use of pressure by mat compression, rather than creating a vacuum, allows the mat 10 to include an integral non-porous facing material as well as permits the production of preshaped fibrous, e.g., insulation, products while providing adhesive bond characteristics similar to that of the vacuum system.

As illustrated in FIG. 3, porous mats 10, precut or shaped to their finished dimensions, are placed on a product entry conveyor 34. The product entry conveyor 34 includes product vacuum hold-down hoods 35 and 36 for holding the mats 10 at a fixed location on the conveyor. Alternatively or additionally, pinch or nip rollers can be employed to move the mats 10 along the entry conveyor 34. Vacuum hold-down hoods permit the mats 10 to be fixed to the entry conveyor 34 closer to adhesive applicator heads 33.

The product entry conveyor 34 conveys the preshaped porous mats 10 past adhesive applicator heads 33. There may be only a few or many adhesive applicator heads 33 across the width of the entry conveyor 34, as needs suggest. The adhesive applicator heads 33 compress portions of the preshaped porous mats 10 and selectively apply a ribbon of adhesive 12 onto the preshaped porous mats 10 while they are compressed. Thereafter, the portions of the porous mats 10 that have been compressed and where the adhesive 12 has been applied substantially return to their original size and shape, thus effectively drawing adhesive that contacts interior surfaces of the mat 10 in its compressed state into the interior of the mats 10 when it returns to its original thickness.

As the porous mat 10 exits the adhesive applicator heads 33, a secondary hold-down vacuum 36 maintains the product position on the exit conveyor 40 until the product is free of compression and travels to the common carrier/porous material contact roller 38.

The entry conveyor 34 transports the adhesive bearing porous mats 10 to a common carrier applicator which includes a roll of common carrier or release liner material 37 which unrolls the common carrier 15 to a common carrier/mat contact roller 38 such that a plurality of preshaped porous mats 10 are adhered to a single common carrier 15 to provide a package 21 of preshaped self-stick panel products on a common carrier.

Additionally, multiple pressure rolls 39 can be used to assure sufficient adhesive bond between the common carrier 15 and the plurality of preshaped porous mats 10, as well as to act as nip rollers driving the mat/common carrier combination along a exit conveyor 30. The distance of these pressure rollers 39 from the conveyor is adjusted to accommodate the thickness of the mats 10, as further explained below.

The common carrier 15 bearing plural preshaped self-stick panel products 10 is then cut to length by a cut-off machine 41, and conveyed by a cut-off machine exit conveyor 42 with another nip roller 43 such that the common carrier 15 bearing the plural preshaped self-stick panel products 10 is rolled up on a roll-up machine 49 as a package 21.

The adhesive applicator heads 33 receive liquefied adhesive from an adhesive bulk storage 31 and an adhesive delivery system 32 for delivering adhesive from the bulk storage to the adhesive applicator heads 33. The adhesive bulk storage 31 can include an adhesive bulk melter, and the delivery system 32 and adhesive applicator heads 33 can include heaters to maintain the adhesive in a liquid state during its transport when the adhesive is a hot melt adhesive.

The adhesive delivery system 32 includes an adhesive delivery path 32A and a separate adhesive return path 32B such that the adhesive is continuously circulated, whether the applicator heads 33 are dispensing adhesive or not. This leads to several advantages. First, the adhesive delivery system 32 likely would have hot spots that would char the adhesive, or cold spots that would cause the adhesive to form a plug, if it were not continuously circulated. Further, by maintaining the delivery and return paths 32A and 32B at substantially the same pressure, the activation or deactivation of one or more applicator heads 33 will not cause a pressure drop or pressure surge in other applicator heads 33.

Figure 4A:
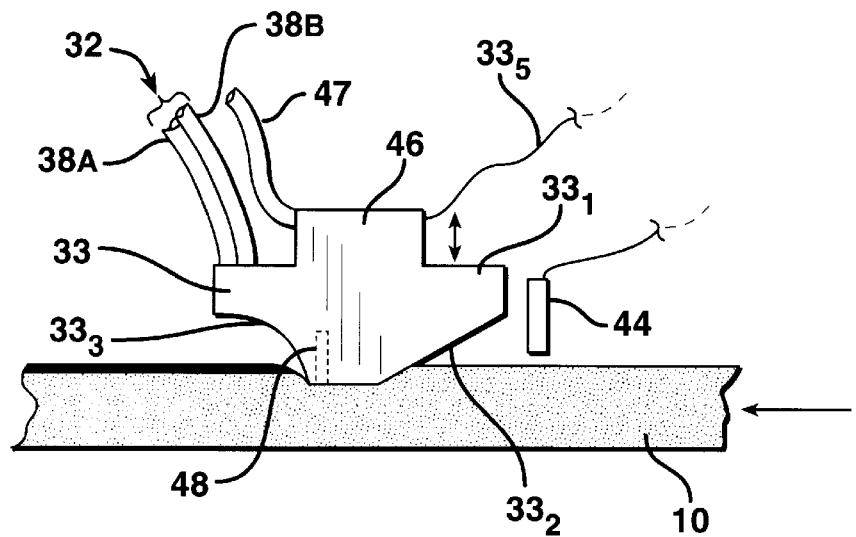
FIG. 4A illustrates a specific embodiment of an adhesive applicator head usable in connection with the process line shown in FIG. 3 in accordance with the present invention.

As illustrated in FIG. 4A, the unique adhesive applicator heads 33 of the present invention each include an adhesive supply line 32A, a return line 32B for receiving adhesive, and a supply of pneumatic pressure 47 to control a pressure relief valve 46. The adhesive applicator heads 33 compress portions of the preshaped porous mats 10 as they pass and include a manifold $33_1$ with a leading edge $33_2$ having a surface forming an acute angle with the porous mats 10 as the porous mats pass thereunder. A trailing edge $33_3$ of each of the applicator heads 33 has a concave surface facing the porous mats, as illustrated in FIG. 4A. An adhesive dispensing port 48 is located between the leading edge $33_2$ and the trailing edge $33_3$ for dispensing adhesive into the passing compressed porous mats.

Figure 4B:
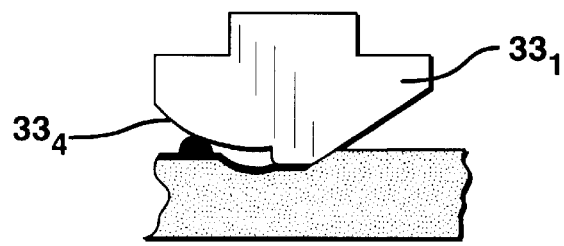
FIG. 4B illustrates a conventional, commercially available adhesive applicator head.

The shape of the applicator heads 33 is important for compression of the fiberglass so as not to produce damage, as well as to quickly and efficiently allow the adhesive to leave the applicator heads 33 without re-contacting surfaces of the applicator heads 33 as the porous material 10 recovers to its original non-compressed thickness. FIG. 4B shows a conventional adhesive applicator head 33', the trailing edge $33_4$ of which, if used in the unique process line 30 of the present invention, would interfere with the application and become covered with adhesive, as shown.

Figure 8:
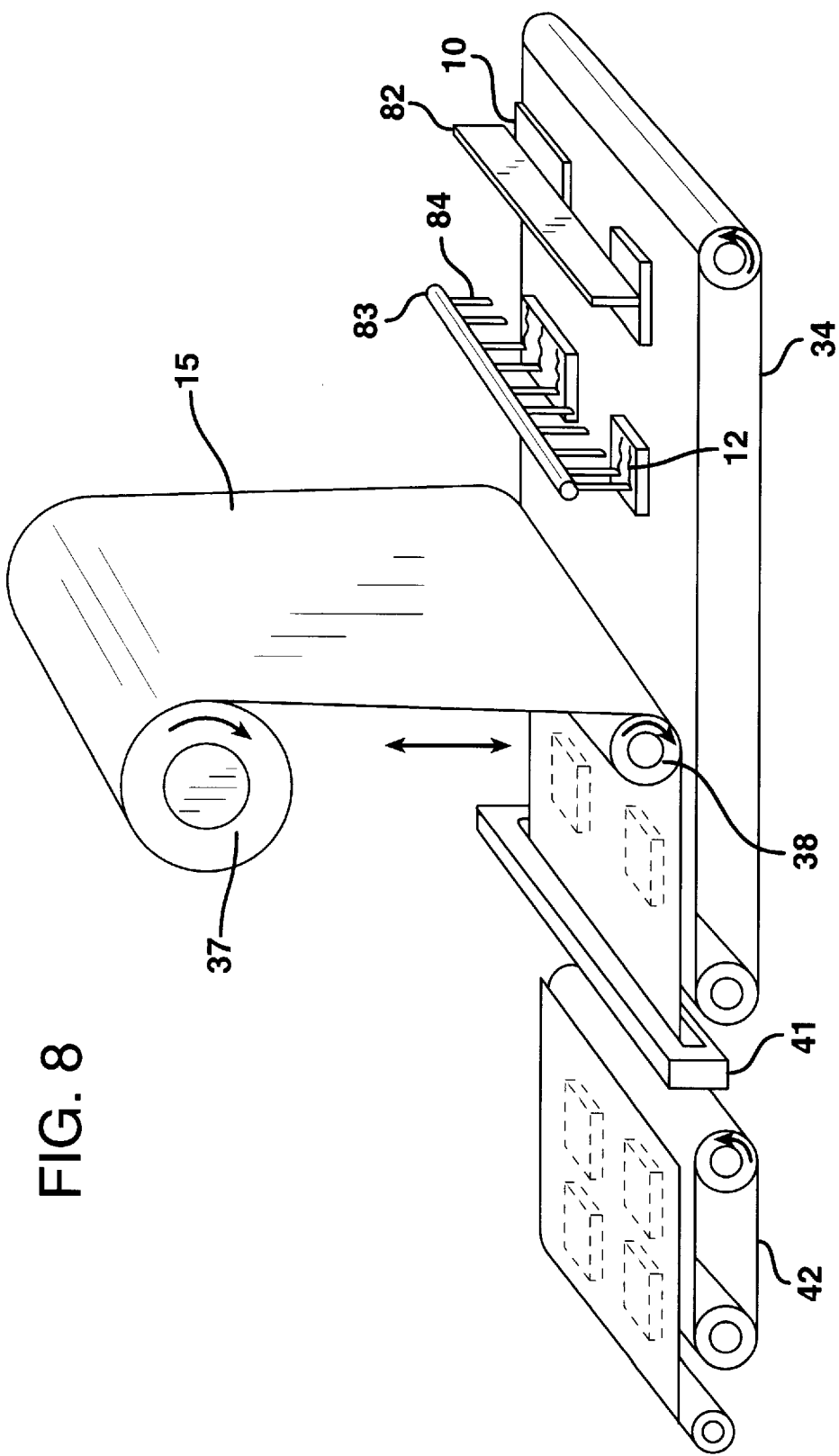
FIG. 8 illustrates a second embodiment of a process line for providing self-stick panel products on a common carrier using hot air nozzles and a glue header in accordance with the present invention.

In an alternative embodiment, the adhesive applicator heads 33 are replaced by a combination of an adhesive dispenser head 82 and hot air manifold 83 with nozzles 84 as illustrated in FIG. 8. The adhesive dispenser head 82 dispenses ribbons of adhesive 12 onto the preshaped porous mats 10. Thereafter, the hot air nozzles 83 then blow the adhesive into the porous mats 10.

The application of the adhesive 12 is selectively controlled, whether in the adhesive applicator heads 33 of FIG. 3 or in adhesive dispenser head 82 of FIG. 8, by the use of product position sensors 44 and product thickness sensors 45, illustrated in FIG. 3 (although the embodiment illustrated in FIG. 8 would largely be the same), and a microprocessor control or program logic controller represented by an electric valve control line $33_5$.

The compression of the fiberglass material is kept constant by the product thickness sensor 45 which adjusts the adhesive applicator head 33 to a correct position. The porous mats 10 are compressed by a predetermined amount, usually more than 1/16th of an inch, but less than 1/2th of an inch, and preferably 1/8th of an inch. The product thickness sensor 45 assures constant uniform compression of the porous mat 10 during adhesive application.

This compression of the mat 10 combined with the heat of the applicator heads 33 forces the adhesive into the porous material, thereby producing a good bond.

Each adhesive applicator head 33 or adhesive port in the adhesive dispenser head 82 is associated with a product position sensor 44. The product position sensors 44 detects the edges of and holes and bevels in the mats 10 in any suitable manner, such as a photosensor which detects a change in light intensity or color due to the presence or absence of a mat 10, or even a finger sensor to physically touch the mat 10. The mat detection signal then activates a counter (not shown) connected to an encoder (not shown) attached to the entry conveyor 34 to count a number of pulses for the duration that adhesive is to be applied within a predetermined zone of the mat 10.

Each of the product thickness sensors 45 can be associated with an adhesive applicator head 33 to control the vertical displacement of the applicator head 33 relative to the top surface of the mat 10 to assure proper compression. The product thickness sensor 45 may be omitted in the embodiment illustrated in FIG. 8, but alternatively may be used to control the force at which the hot air exits the nozzles 83.

Because of the position sensors 44 and thickness sensors 45, the unique process line 30 of the present invention can be used to provide plural self-stick products 10 of unique shapes on a single common carrier 15.

Dispenser Machines

Figure 5:
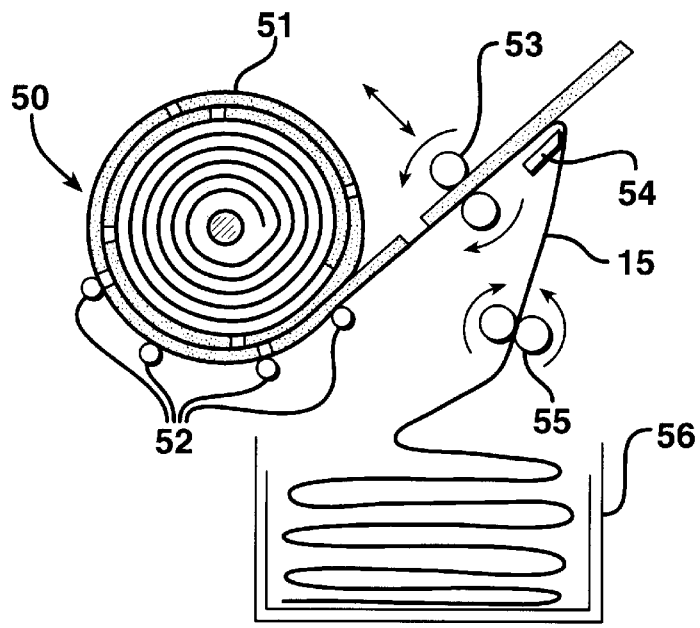
FIG. 5 illustrates one embodiment of a dispenser machine for dispensing the self-stick panel products from the common carrier in accordance with the present invention.

The system for providing the preshaped self-stick panel products includes a dispenser machine 50, 60. One example is illustrated in FIG. 5 wherein the dispenser machine 50 includes cradle rollers 52 for supporting a roll of products 41. As the common carrier 15 is drawn from the roll of products 41 the self-stick panel products unwind from the roll 41 through pinch rollers 53. A separating bar 54 is used to pull the common carrier 15 away from the self-stick panel products 10 for either automatic or manual placement on the substrate to which the self-stick panel product is to be adhered, such as the metal panels of an HVAC system. A pinch roller mechanism 55 is used to draw the common carrier 15 into a release liner container 56.

A self-stick product 10 on the common carrier 15 is indexed by a machine operator so that it is contained within the pinch rollers 53. These rollers 53 provide a back-tension on the common carrier 15 so that the common carrier 15 can be held tightly against the separating bar 54. The common carrier is threaded by hand into the pinch rollers 55, which are driven such that the release liner 15 is pulled across a separating bar 54 and is deposited to the common carrier container 56 of the machine or is rewound on a mandrel or reel 64 (see FIG. 6) for possible recycling.

Figure 6:
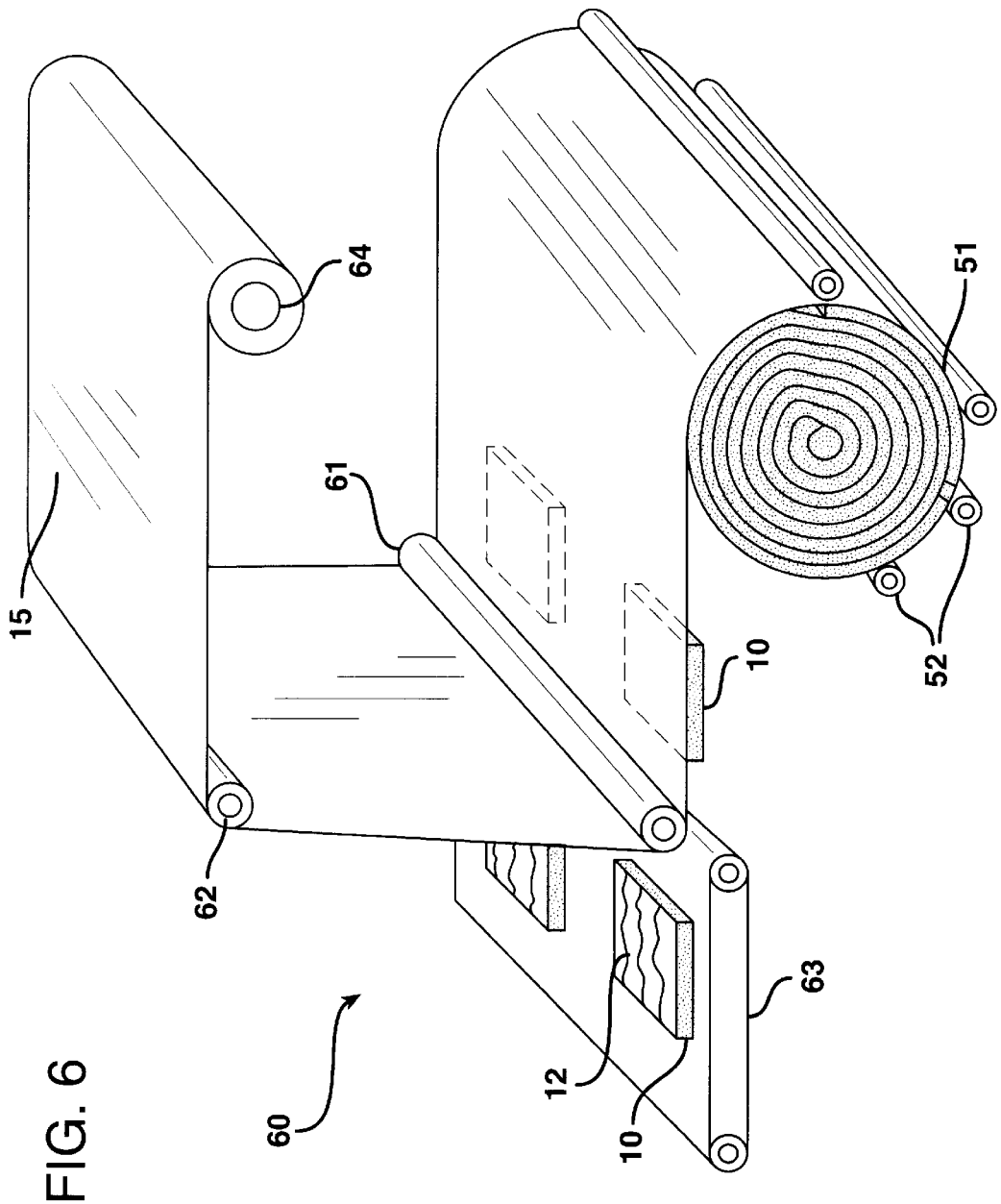
FIG. 6 illustrates yet another embodiment of a dispensing machine for separating self-stick panel products from a common carrier in accordance with the present invention.
Figure 7:
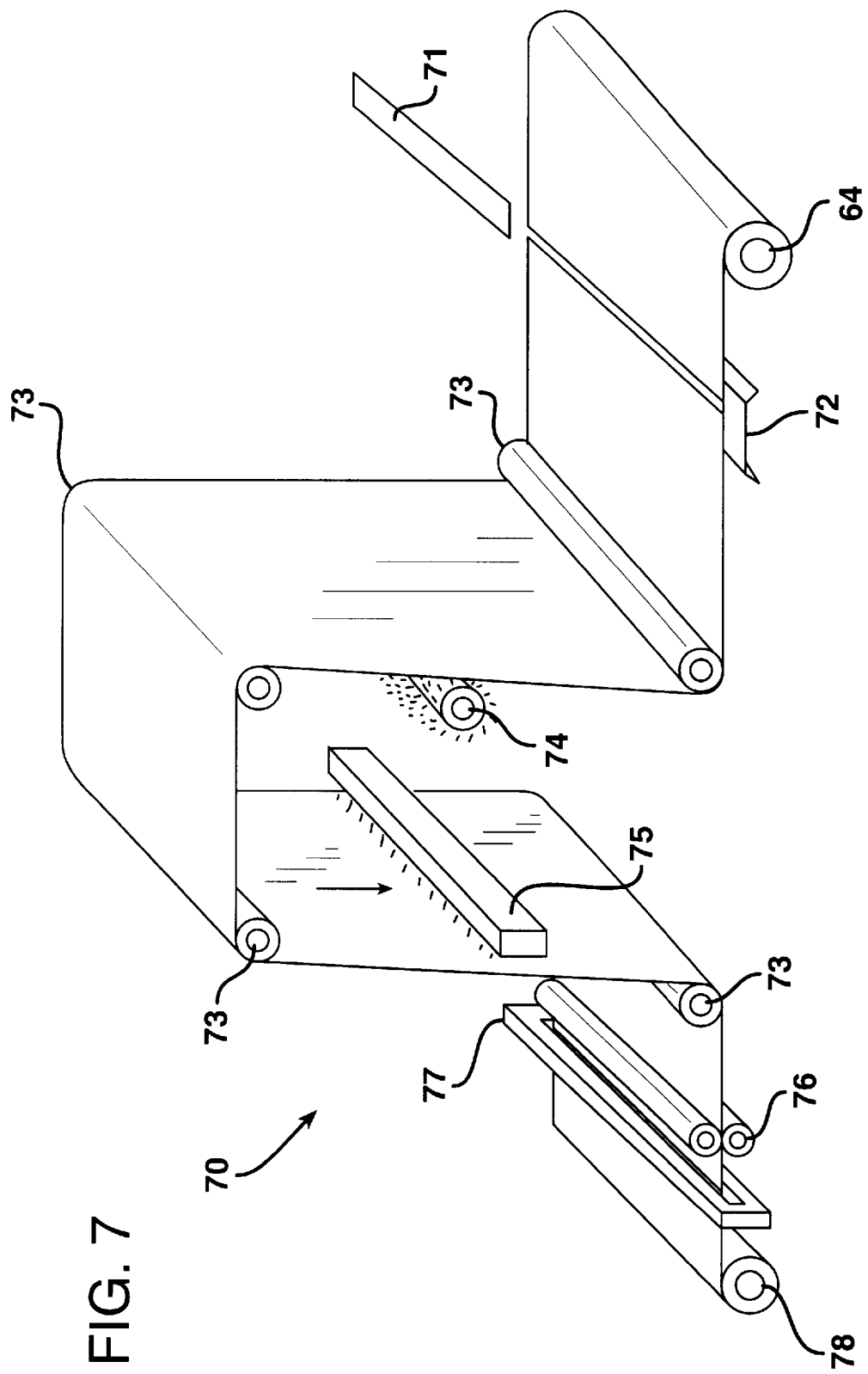
FIG. 7 illustrates the carrier refurbishing process for refurbishing the common carrier separated from the self-stick panel products in accordance with the present invention.

As an alternative to this mechanism, FIG. 6 illustrates yet another dispensing mechanism 60 wherein the package 41 of self-stick panel products on a common carrier is placed into cradle rollers 52, as done in the embodiment illustrated in FIG. 5. However, rather than a separating bar 54, a small diameter stripper roller 61 is used to separate the common carrier 15 from the self-stick panel products 10. The common carrier 15 then passes over another roller 62 and onto a reel 64. The reel 64, once a sufficient amount of common carrier 15 placed is placed thereon, is then sent back to the manufacturer for recycling. An outfeed conveyor 63 then conveys the self-stick panel products 10 to a position where they can be utilized for their end purpose.

Refurbisher

Whether the embodiment of FIG. 5 or the embodiment of FIG. 6 is used as a dispenser, the common carrier 15 which has been released from the packaged product 41 can be returned to a fabrication center and placed into a common carrier refurbisher 70. The reel 64 or the common carrier container 56 is placed at one end of the refurbisher 70. A splice table 72 is used to juxtapose two terminal ends of common carrier 15 to be recycled. A splice tape 71 is then used to splice together the two terminal ends of the common carrier 15. The spliced together common carrier 15 then passes several rollers 73 such that the common carrier 15 passes through a wash mechanism including a wash brush roller 74 and a dryer head 75. Typically, only one side of the common carrier 15 needs to be washed, though additional wash brush rollers 74 may be added if both sides are to be washed. Similarly, the dryer head 75 can be placed on both sides of the common carrier 15.

The refurbished common carrier 15 is then output along an output conveyor which includes a vacuum hood (not illustrated) or pinch rollers 76 which effectively draws the common carrier through the refurbisher 70. Thereafter, a cutoff machine or chopper 77 cuts the spliced common carrier into predetermined lengths which are placed on a rewinder master 78. This rewinder master 78 may then be used as the roll 37 of common carrier illustrated in FIGS. 3 and 8.

By the unique system described above, a production process for producing a self-stick panel product on a common carrier applies pressure sensitive hot melt adhesive or the like in extruded ribbon form to fiberglass insulation or other porous mat 10. The process provides excellent adhesion to the surface of the porous mat 10 while allowing this process to be used for products which have an integral facing material bonded to the opposite side of the porous mat 10. This unique process is accomplished without the use of vacuums, or elevated and ramped conveyors.

As part of this invention, the unique process allows finished cut porous material parts of various uniform and non-uniform shapes (including products with holes, voids, and non-adhesive applied flange zones) to be coated with adhesive at production speeds and facilitates the packaging of these individual products 10 in a common roll 41 for utilizing a common release material 15.

These self-stick products 10 can then be unpackaged by the customer such that the individual self-stick products 10 can be manually, semi-automatically or automatically dispensed from the dispenser machine 60 or 70. The individual products 10 are separated from the protective release liner substrate 15 such that the release substrate 15 is collected within the device, thereby facilitating possible recycling of the common carrier 15. The self-stick products 10 of finished shape are then presented to the person or machine in such a manner that the products are easily grasped, held and removed from the device without the difficulty of attempting to manually separate the release liner substrate from the adhesive material.

Preferred embodiments of the present invention have been described in detail. However, various modifications and improvements thereon will be readily apparent to those skilled in the art. Accordingly, the spirit and scope of the invention are to be limited only by the appended claims and not by the foregoing specification.

We claim:

1. A method of providing a package of preshaped self-stick products, comprising the steps of:
   compressing and selectively applying adhesive to each of a plurality of preshaped compressible mats using at least one adhesive applicator head; and
   applying a common carrier to said plurality of compressible mats using a common carrier applicator to form a package.

2. A method in accordance with claim 1, wherein said step of compressing includes compressing said each of a plurality of preshaped compressible mats with a leading edge of at least one adhesive applicator head having a surface forming an acute angle with said compressible mats during relative movement of said compressible mats and said adhesive applicator head, applying said adhesive at an adhesive dispensing port before passing a trailing edge having a concave surface facing said compressible mats.

3. A method in accordance with claim 1, further comprising the step of detecting boundaries of said compressible mats for controlling said at least one adhesive applicator head.

4. A method in accordance with claim 1, further comprising the step of dispensing said compressible mats from said package.

5. A method in accordance with claim 4, further comprising the step of refurbishing said common carrier after all of said compressible mats are dispensed therefrom.

6. A system for providing preshaped self-stick products, comprising:
   a process line including
     at least one adhesive applicator head for compressing preshaped mats, and for selectively applying adhesive to said preshaped mats, and
     a common carrier applicator for applying a common carrier to said preshaped mats, said at least one adhesive applicator head for applying adhesive for adhering said preshaped mats to said common carrier, thereby providing a package of preshaped self-stick products on a common carrier;
   a dispenser machine including a stripper for selectively removing said common carrier from said preshaped self-stick panel products; and
   a common carrier refurbisher.

7. A system in accordance with claim 6, wherein said at least one adhesive applicator head includes a leading edge having a surface forming an acute angle with said preshaped mats during movement of said preshaped mats relative to said at least one adhesive applicator head, a trailing edge having a concave surface facing said preshaped mats, and an adhesive dispensing port located between said leading edge and said trailing edge for dispensing adhesive onto said passing compressed preshaped mats.

8. A system in accordance with claim 6, wherein said dispenser machine includes cradle rollers for supporting said package of preshaped self-stick products on a common carrier, a drive mechanism for moving said preshaped self-stick products on a common carrier, a separating bar for separating said common carrier from said preshaped self-stick products, pinch rollers for moving said separated common carrier, and a container for storing said separated common carrier.

9. A system in accordance with claim 6, wherein said dispenser machine includes cradle rollers for supporting said package of preshaped self-stick products on a common carrier, a stripper roller for separating said common carrier from said preshaped self-stick products, and a reel for storing said separated common carrier.

10. A system in accordance with claim 6, further comprising an adhesive delivery system including an adhesive delivery path and an adhesive return path.

11. A system in accordance with claim 6, wherein said process line further comprises at least one sensor for detecting boundaries of said preshaped mats for controlling said at least one adhesive applicator head.

12. A system in accordance with claim 6, wherein said adhesive is located exclusively within an adhesive border zone spaced from the edges of said preshaped mats.

13. A system in accordance with claim 6, wherein at least one of said preshaped mats includes a flange zone where said adhesive is absent.

14. A system in accordance with claim 6, wherein said common carrier refurbisher includes a wash brush roller and a dryer head.

15. A process line producing a package of preshaped self-stick products, comprising:
    at least one adhesive applicator head for simultaneously compressing and selectively applying adhesive to each of a plurality of preshaped compressible mats; and
    a common carrier applicator for applying a common carrier to said plurality of compressible mats.

16. A process line in accordance with claim 15, wherein said at least one adhesive applicator head includes a leading edge having a surface forming an acute angle with said compressible mats during relative movement of said compressible mats and said adhesive applicator head, a trailing edge having a concave surface facing said compressible mats, and an adhesive dispensing port located between said leading edge and said trailing edge for dispensing adhesive onto said compressible mats.

17. A process line in accordance with claim 15, further comprising an adhesive bulk storage member and an adhesive delivery system for delivering adhesive from said bulk storage member to said at least one adhesive applicator head, wherein said adhesive delivery system includes an adhesive delivery path and an adhesive return path.

18. A process line in accordance with claim 15, further comprising at least one sensor for detecting boundaries of said compressible mats for controlling said at least one adhesive applicator head.

19. A process line in accordance with claim 18, wherein said at least one sensor includes a product position sensor and a product thickness sensor.

20. A process line in accordance with claim 15, wherein said common carrier applicator includes a common carrier dispenser, a contact roller for bringing said common carrier in contact with a surface of each of said compressible mats on which said adhesive has been applied.

21. A process line in accordance with claim 15, wherein said common carrier applicator includes multiple pressure rollers for applying pressure to said common carrier in contact with said adhesive applied to said compressible mats.

* * * * *